(12) United States Patent
Hussain

(10) Patent No.: US 10,436,148 B2
(45) Date of Patent: Oct. 8, 2019

(54) CONVERGENT-DIVERGENT NOZZLE

(71) Applicant: ROLLS-ROYCE plc, London (GB)

(72) Inventor: Zahid M Hussain, Derby (GB)

(73) Assignee: ROLLS-ROYCE plc, London (GB)

( * ) Notice: Subject to any disclaimer, the term of this patent is extended or adjusted under 35 U.S.C. 154(b) by 669 days.

(21) Appl. No.: 15/079,797

(22) Filed: Mar. 24, 2016

(65) Prior Publication Data

US 2016/0305368 A1 Oct. 20, 2016

(30) Foreign Application Priority Data

Apr. 17, 2015 (GB) .................................. 1506517.0

(51) Int. Cl.
*F02K 1/18* (2006.01)
*F02K 1/06* (2006.01)
*F02K 1/08* (2006.01)

(52) U.S. Cl.
CPC .................. *F02K 1/18* (2013.01); *F02K 1/06* (2013.01); *F02K 1/08* (2013.01); *F05D 2250/323* (2013.01); *F05D 2250/324* (2013.01); *F05D 2300/505* (2013.01)

(58) Field of Classification Search
CPC ......... F05D 2250/323; F05D 2250/324; F05D 2300/505; F02K 1/18; F02K 1/06; F02K 1/08; F02C 7/25
See application file for complete search history.

(56) References Cited

U.S. PATENT DOCUMENTS

| 4,122,810 | A | 10/1978 | Berriman |
| 7,578,132 | B2 * | 8/2009 | Webster .................. F02K 1/383 60/226.1 |
| 2008/0098747 | A1 | 5/2008 | Sheldon et al. |
| 2009/0173077 | A1 | 7/2009 | Lynch et al. |

FOREIGN PATENT DOCUMENTS

| CN | 102518517 A | 6/2012 |
| EP | 1607603 A2 | 12/2005 |
| EP | 2 966 288 A1 | 1/2016 |
| GB | 2 437 295 A | 10/2007 |
| WO | 2014/202881 A1 | 12/2014 |

OTHER PUBLICATIONS

Oct. 9, 2015 Search Report issued in Brittish Patent Application No. 1506517.0.

Aug. 16, 2016 Search Report issued in British Patent Application No. 1604922.3.

* cited by examiner

*Primary Examiner* — Carlos A Rivera
(74) *Attorney, Agent, or Firm* — Oliff PLC

(57) ABSTRACT

A convergent-divergent nozzle arranged to convey fluid from an upstream zone to a downstream zone via a throat aperture, wherein the nozzle includes an assembly movable to vary the size of the throat aperture of the nozzle, thereby regulating the flow of fluid to the downstream zone.

14 Claims, 3 Drawing Sheets

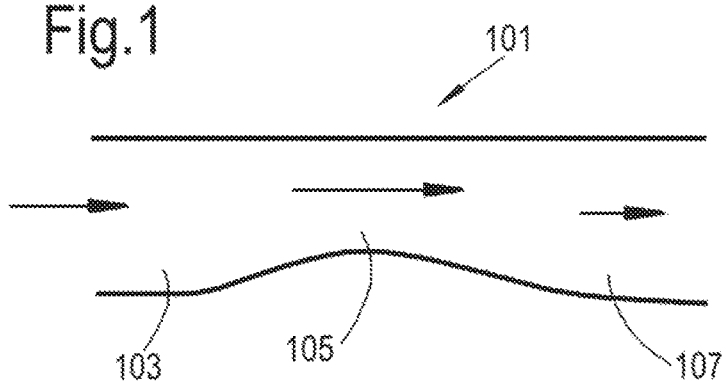
PRIOR ART
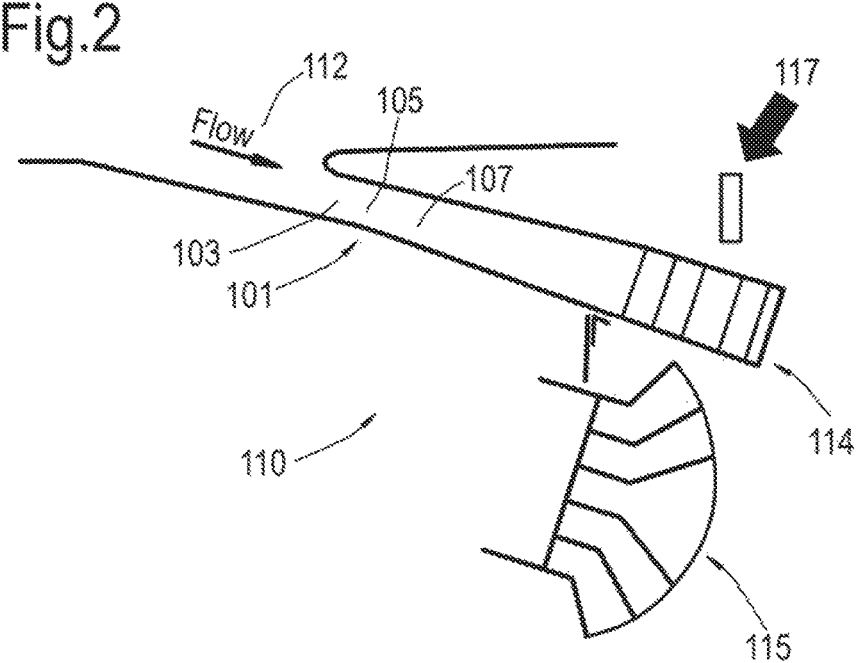
PRIOR ART

CONVERGENT-DIVERGENT NOZZLE

CROSS-REFERENCE TO RELATED APPLICATIONS

This application is based upon and claims the benefit of priority from British Patent Application Number 1506517.0 filed 17 Apr. 2015, the entire contents of which are incorporated by reference.

BACKGROUND

1. Field of the Disclosure

The present disclosure relates to a convergent-divergent nozzle; in particular, but not exclusively, to an adjustable convergent-divergent diffuser e.g. for a gas turbine engine.

2. Description of the Related Art

Convergent-divergent nozzles (con-di nozzles) are known. They can be used to meter air flow in a conduit containing the con-di nozzle. The flow accelerates as it moves towards the 'throat' of the nozzle, and when it achieves the speed of sound the mass flow cannot increase further for a given inlet pressure and temperature. The flow is then decelerated downstream to allow the dynamic head to be recovered so that high pressure gas is delivered to the target zone.

Fire zones are common on aero-engines. They are designated to be any zone that contains both ignition sources (such as hot surfaces or high power/voltage electrical systems) and flammable fluids/fuels (such as aviation fuel or oil) that might leak from units or pipes within the zone thus leading to a fire. This may be one definition of a fire-critical zone. Regulations dictate that these zones must be ventilated with fresh air to minimise the possibility that a fire might occur by reducing the 'fuel' to air ratio. Thus, an alternative or additional definition of a fire-critical zone may be a zone that requires a predetermined (for example by regulation) flow rate of ventilation fluid during use. These zones often contain electrical and mechanical units that are sensitive to high temperatures and so the ventilation also has the function of cooling them.

In aero-engines, conduits such as inlet scoops are commonly used to take air from a 'mainstream' flow and direct it into a particular zone such as a fire zone, or towards some device that uses the fluid, via a conduit. These conduits typically incorporate a known con-di nozzle, and are sometimes referred to as convergent-divergent diffusers (con-di diffusers).

Airworthiness regulations dictate five volume changes of air per minute are required to minimise the possibility of fire in a fire zone in an aero-engine. This necessitates a relatively large inlet scoop, and convergent-divergent nozzle with a large throat are designed into the system to achieve the required air flow at low altitude where the aircraft forward speed is low. Consequently, at high altitude this can produce more than forty air changes per minute. This is not problematic for the fire zone, but the excess air flow represents an aerodynamic inefficiency since the air contains a large dynamic head which is lost. This aerodynamic inefficiency leads to higher fuel consumption.

OBJECTS AND SUMMARY

Accordingly, proposed is a convergent-divergent nozzle (con-di nozzle) arranged to convey fluid from an upstream zone to a downstream zone, wherein the nozzle includes an assembly movable to vary the size of the throat aperture of the nozzle, thereby regulating the flow of fluid to the downstream zone.

According to an aspect, there is provided a gas turbine engine comprising an upstream zone and a downstream zone, wherein:

the downstream zone is a fire-critical zone that requires a predetermined flow rate of ventilation fluid during use;

a convergent-divergent nozzle is provided between the upstream zone and the downstream zone, and is arranged to convey fluid from the upstream zone to the downstream zone via a throat aperture; and the nozzle includes an assembly movable to vary the size of the throat aperture of the nozzle, thereby regulating the flow of ventilation fluid to the downstream zone.

Thus, where the characteristics of the fluid in the upstream zone change, e.g. a change in temperature and/or pressure, a con-di nozzle according to the present disclosure allows for the flow of fluid to the downstream zone to be regulated by varying the size of the throat provided by the nozzle. Therefore, for example, the flow rate to the downstream zone can be maintained irrespective of the change in the upstream zone fluid characteristics.

In particular, a con-di nozzle according to the present disclosure is able to maintain a consistent number of volume changes of air per minute in a fire zone provided at the downstream zone, both at low altitude where the forward speed is low and at high altitude where the forward speed is high, or at least less variation in the number of volume changes of air per minute between relatively high and relatively low forward speeds. This eliminates the excess air flow discussed above and improves the aerodynamic efficiency of the engine, which in turn reduces fuel consumption.

The movable assembly may be movable between a first position in which the convergent-divergent nozzle presents a first throat aperture through which the fluid is able to flow, and a second position in which the convergent-divergent presents a second throat aperture through which the fluid is able to flow, the first and second throat apertures being of respectively different sizes.

The movable assembly may include at least one member formed of a shape memory alloy.

The movable assembly may be movable between a first position in which the convergent-divergent nozzle presents a first throat aperture through which the fluid is able to flow, and a second position in which the convergent-divergent presents a second throat aperture through which the fluid is able to flow, the first and second throat apertures being of respectively different sizes.

The at least one member may be configured such that heating the at least one member above a predetermined temperature causes the movable assembly to adopt the first position.

The at least one member may be arranged to be heated by passing an electric current through the at least one member.

The at least one member may be heatable by one or more heater elements controllable to heat the at least one member above the predetermined temperature.

The at least one member may be configured such that cooling, or maintaining, the at least one member below the predetermined temperature causes the movable assembly to adopt the second position.

The movable assembly may include a spring member, arranged to urge the movable assembly to resile to the second position.

The spring member may be provided in the form of a spring sheet.

The at least one member may be provided in the form of a sheet member.

The spring member and the sheet member may be provided as a laminate sub-assembly.

The at least one member may be provided in the form of a wire spanning a concave portion of the spring sheet to be capable of causing the movable assembly to adopt the first position in response to being heated above the predetermined temperature.

In the first position, the convergent-divergent nozzle may present a relatively small throat aperture through which the fluid is able to flow; in the second position the convergent-divergent may present a relatively large throat aperture through which the fluid is able to flow.

Alternatively, in the first position, the convergent-divergent nozzle may present a relatively large throat aperture through which the fluid is able to flow; in the second position the convergent-divergent may present a relatively small throat aperture through which the fluid is able to flow.

Also provided is an aero-engine incorporating a convergent-divergent nozzle according to present disclosure. In such an aero-engine the downstream zone includes a fire zone.

Also provided is a method of assembling an aero-engine including the step of incorporating a convergent-divergent nozzle according to the present disclosure into the aero-engine.

Also provided is a method of retro-fitting a convergent-divergent nozzle according to the present disclosure in an aero-engine.

A con-di nozzle according to the present disclosure may be provided in a con-di diffuser, e.g. incorporated in an aero-engine. Thus, the present disclosure also provides a con-di diffuser.

BRIEF DESCRIPTION OF THE DRAWINGS

Exemplary embodiments will now be described by way of example with reference to the accompanying drawings in which:

FIG. 1 shows a schematic of a known static con-di nozzle;

FIG. 2 shows a schematic of an aero-engine inlet scoop incorporating a known static con-di nozzle, providing a con-di diffuser for supplying air to a fire zone in the engine;

DETAILED DESCRIPTION OF EMBODIMENTS

Figure 3A:
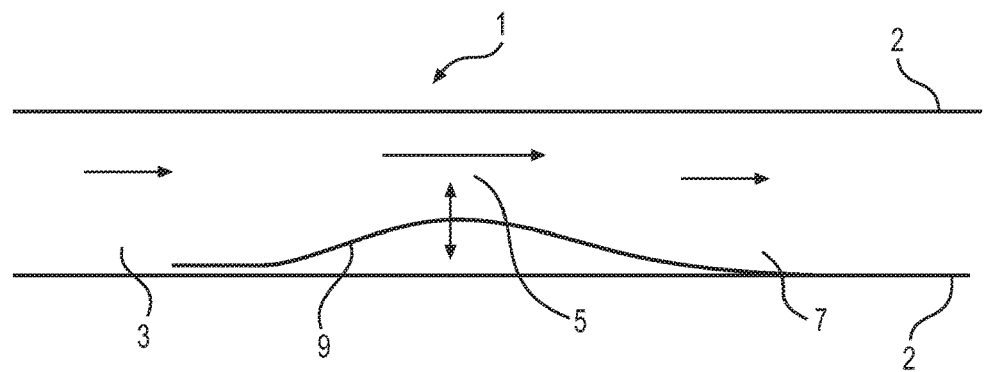
FIG. 3A shows a schematic of a general embodiment in a first configuration.

FIG. 1 shows a known con-di nozzle 101 with a fluid, e.g. air, flowing through it as indicated by the arrows. Such a known con-di nozzle 101 provides at an upstream region thereof a convergent section 103, followed by a fixed aperture throat section 105 and a subsequent divergent section 107.

In such an arrangement, sub-sonic air is accelerated in the convergent section 103 towards the throat 105 where it would normally achieve sonic conditions. Thus the throat 105 is choked and for given inlet conditions (temperature and pressure) the mass flow rate is fixed.

This flow is then decelerated in the divergent section 107 to recover the dynamic head to ensure that there is sufficient pressure to move the flow through the desired zone and overboard e.g. after it has completed its ventilation and cooling function.

FIG. 2 shows a known con-di diffuser 110 incorporating a known con-di nozzle 101 similar to that shown in FIG. 1 for example. The con-di diffuser 110 includes an inlet scoop 112 for accepting air from a main flow zone and directing it to the con-di nozzle 101. Downstream of the con-di nozzle 101, a diffuser section 114 (shown in cross-section) is provided such that the flow slowed down at the exit of the con-di nozzle 101 is spread so that it flows down both sides of a nacelle, starboard and port for example. A plan view of the diffuser section 114 is indicated by reference numeral 115. This known arrangement suffers the problems discussed above.

Figure 3B:
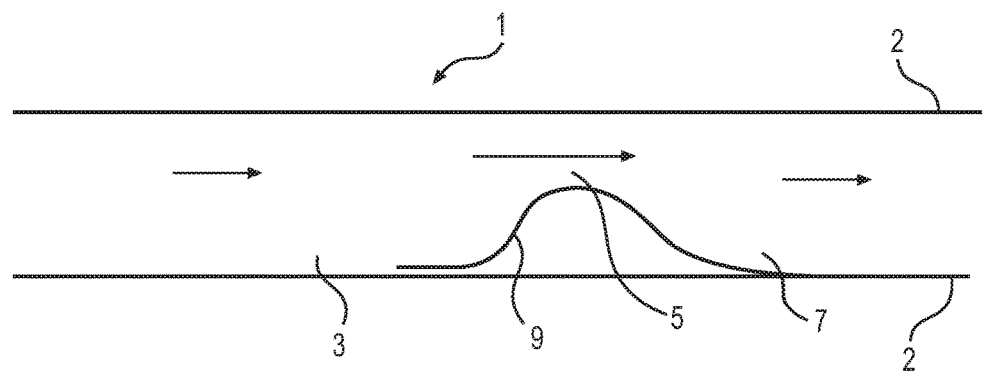
FIG. 3B shows a schematic of the general embodiment of FIG. 3A in a second configuration.

Accordingly, the present disclosure provides a variable throat con-di nozzle 1 as shown in FIGS. 3A and 3B. The con-di nozzle 1 is installed in a conduit 2 to provide an upstream convergent section 3, a downstream throat section 5 and a subsequently downstream divergent section 7.

However, rather than providing a con-di nozzle defining a throat section 5 having a fixed size aperture, the present disclosure provides a movable assembly 9, which is actuatable (controllable) to be moved within the throat section 5 to vary the size of the aperture in the throat region 5 which is presented to the fluid flow.

In other words movable assembly 9 is actuatable to vary the size of the throat aperture in the throat region 5.

Accordingly, in response to a change in (upstream) inlet conditions (temperature and pressure), the movable assembly 9 is actuatable to change the size of the throat aperture, thereby allowing a variety of choke conditions to be satisfied in the throat region 5 such that the desired mass flow rate at the exit of the divergent section 7 can be achieved or maintained in response to the change in the inlet conditions.

In particular, in an aero-engine, where the temperature and pressure of the air at the inlet to the convergent section 103 varies between (i) a condition in which the aero-engine is at low altitude where the forward speed is low, and (ii) a condition in which the aero-engine is at high altitude where the forward speed is high, the size of the throat aperture can be varied accordingly by movement of the movable assembly 9 to maintain a desired air flow, e.g. mass flow, at the exit of the divergent section 7. The air flow can then be directed, e.g. to a fire zone or other zone within the engine.

In embodiments, the movable assembly 9 includes an actuatable movable member formed of a shape memory alloy (SMA), such that actuation of the member results in the movable assembly 9 adopting a predetermined configuration to provide the desired throat aperture.

In embodiments, an SMA actuated con-di nozzle according to the present disclosure is intended to have two shapes (configurations) providing two metered flows, e.g. one for low-altitude high-flow conditions and the other for high-altitude low-flow conditions. The SMA changes shape so that the movable assembly 9 provides two different throat aperture sizes (i.e. two different throat areas) in order to achieve this as illustrated in FIGS. 3A and 3B.

It is intended that the SMA member is actuated by the addition of heat—preferably by electrical means, but it could be by blowing hot air onto the SMA member taken from the engine.

The high-flow/large throat condition may be provided by the shape of the SMA member when cold, as illustrated in FIG. 3A, while the low-flow/small throat condition is provided by the shape of the SMA member when heated above the actuation threshold temperature of the shape memory alloy, as illustrated in FIG. 3B. Arranging the SMA member to operate in this way means that failure of the heating system leaves the nozzle in the fail-safe high-flow condition.

Figure 4:
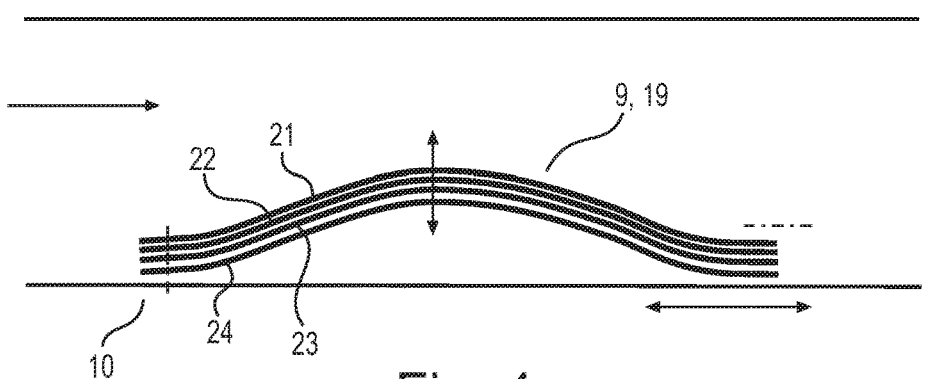
FIG. 4 shows a first embodiment.

FIG. 4 shows an embodiment in which the movable assembly 9 is provided as a laminate assembly 19. The arrow indicates the direction of flow of the air (fluid) through the nozzle.

Laminate assembly 19 may comprise three layers:
1. A heating pad 24 for example heatable electrical wires embedded in a silicon rubber.
2. An SMA member 23 in the form of a sheet (or one or more SMA sheets), preferably in direct thermal contact with the heater pad 24 the SMA sheet 23 may be formed of NiTiCu for example.
3. A metal spring material 22—preferably metallic, e.g. titanium.

These layers may be provided in any order, but it is envisaged that the SMA sheet will be in direct thermal contact with the heating pad.

It is also envisaged that the heating pad is provided as the furthermost layer from the air flow, for example, the lower most of the layers shown in FIG. 4.

An optional fourth layer may be provided as shown in FIG. 4. Where provided, the fourth layer is incorporated into the laminate assembly 19 as an outer insulating layer 21 to reduce the heat transfer to the air passing over the system and hence minimise the power requirements to keep the SMA member above the activation threshold temperature. Thus, this insulating layer 21 may be provided in direct contact with the air flowing through the con-di nozzle shown in in FIG. 4, i.e. the upper most layer shown in FIG. 4.

All three (or four) layers may be fixed or bonded together to form a single structure, e.g. a laminate structure, so that they move together.

The SMA sheet has (at least) two forms or configurations. Upon heating the sheet to above an activation threshold temperature (actuation temperature), the sheet is actuated to move between the configurations, for example from a less curved shape to a more curved shape. When heating ceases or is reduced such that the temperature of the sheet drops to below the threshold, the spring sheet urges the laminate assembly 19 to resile (return) to the original configuration, for example to the less curved position. The cycle can be repeated as needed.

Figure 5:
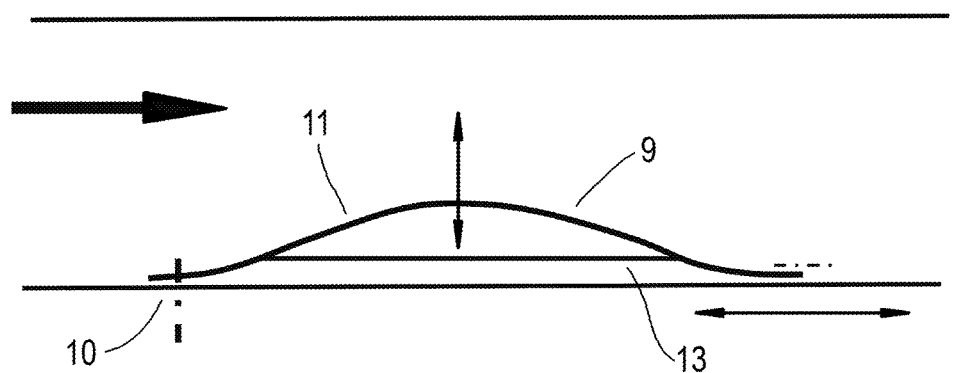
FIG. 5 shows a second embodiment.

FIG. 5 shows another embodiment. In this arrangement, the movable assembly 9 includes a spring sheet 11 similar to that described above, but the actuatable movable SMA member 13 is provided in the form of one or more wires rather than a sheet.

The spring sheet 11 is formed into a curved shape. The SMA wire 13 is attached at each end to the spring sheet 11, e.g. to span across the concave region of the curved spring sheet 11.

Heating of the SMA wire 13 causes it to change in length causing the curved spring member 11 to change from a first to a second configuration resulting in a change in the size of the throat aperture presented to the air flow. For example, heating the SMA wire 13 above its activation threshold temperature (actuation temperature) preferably causes it to reduce in length such that the change in form (configuration) of the wire increases the curvature of the spring plate causing it to project further into the throat region 7 and consequently reduce the throat area.

Turning off (or reducing) the heating such that the SMA wire is reduced to below the activation threshold temperature causes the wire to return to its original (longer) length and allows the spring sheet to return to its original shape and withdraw from the throat region 7, thereby increasing the size of the throat aperture presented to the air flow.

The wire could be actuated by the addition of hot air, or by a heater pad or another heating arrangement provided separately to the SMA wire(s) themselves. However, it is envisaged that the wire has electricity passed through it, thereby providing self-heating by electrical resistance.

Of course, one or more SMA wires could be provided, the present disclosure is not limited to a single SMA wire.

For each of the embodiments shown in FIGS. 4 and 5, an upstream region of the movable assembly 9 is preferably fixed in place to the duct in which it sits, e.g. to be immovable in the direction parallel to the direction of flow of the of the of the air/fluid in the duct. For example, it may be fixed in place by being bonded to the duct wall, or with a bolt or screw 10.

Whereas, the downstream region of the movable assembly may be arranged to be slidable relative to the duct, e.g. in a direction parallel to the direction of flow of the air/fluid in the duct.

Hence, the con-di nozzle 1 would simply be able to bend between the two required shapes (configurations).

The slidable downstream region of the movable assembly 9 may, nonetheless, be slidably coupled to the duct to ensure that the duct wall and the downstream region nozzle could not mutually separate (decouple) during use. This could be achieved in a number of ways, including fixing a retaining plate over the downstream region of the movable member 9, but it may be achieved with the use of fixings such that suitable regions of the movable member 9 is slotted under the fixing heads. Here, the downstream region indicates a region of the con-di nozzle which is typically downstream of the divergent section 7 for example.

In the embodiments shown, one wall of the duct incorporating the con-di nozzle is shown as flat (viewed in cross-section) and the other incorporates the curvature of the movable assembly 9 to provide the con-di nozzle functionality. However, the duct wall facing the movable member 9 could be formed to provide some of the convergence and/or divergence effect, for example by projecting towards the movable member 9.

The throat of a con/di nozzle according to the present disclosure provides a variable restriction to the flow of fluid through the nozzle; in embodiments this is achieved by the addition of heat and the action of an SMA to make the throat section change shape (and thus change the size of the throat aperture) such that it is able to further limit the ventilation flow at high altitude/cruise conditions. This reduces the flow under such conditions, and thus improves fuel consumption while maintaining the higher flow area at low altitudes. It is estimated that the application of a con-di according to the present disclosure to aero-engines may result in improved fuel consumption at cruising speeds and altitude of approximately 0.06%. Furthermore, embodiments, for example as shown in FIGS. 4 and 5, are lightweight and thus do not add any appreciable mass to an aero-engine which would otherwise reduce the fuel consumption efficiency.

Furthermore, a con-di nozzle according to the present disclosure is retro-fittable to existing aero-engines because it is only slightly larger than the existing arrangements, and the method of actuation does not require bulky or complicated arrangements.

In particular, when applied to aero-engines, such as gas turbine engines, a con-di nozzle according to the present disclosure provides a particularly advantageous solution, both for fitting to newly assembled engines and for retrofitting. This is because, as shown in FIG. 2, existing aero-engines incorporate a hinge beam 117. The hinge beam 117 is a structural connection between the port and starboard fan cowl doors at the top of the engine, and its presence restricts the space available for fitting con-di nozzles incorporating complicated valve arrangements. Indeed, in many engines, the hinge beam 117 ensures that there is insufficient room for such an arrangement and so the present disclosure provides a suitable alternative.

Figure 6:
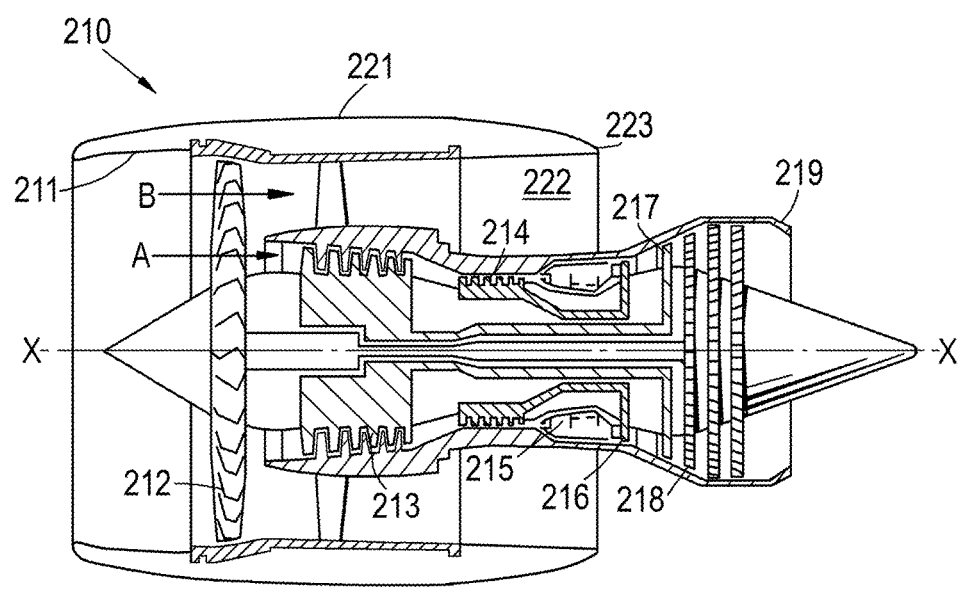
FIG. 6 shows a gas turbine engine incorporating a con-di nozzle according to the present disclosure.

With reference to FIG. 6, a ducted fan gas turbine engine incorporating a con-di nozzle according to the present disclosure is generally indicated at 210 and has a principal and rotational axis X-X. The engine comprises, in axial flow series, an air intake 211, a propulsive fan 212, an intermediate pressure compressor 213, a high-pressure compressor 214, combustion equipment 215, a high-pressure turbine 216, an intermediate pressure turbine 217, a low-pressure turbine 218 and a core engine exhaust nozzle 219. A nacelle 221 generally surrounds the engine 210 and defines the intake 211, a bypass duct 222 and a bypass exhaust nozzle 223.

During operation, air entering the intake 211 is accelerated by the fan 212 to produce two air flows: a first air flow A into the intermediate pressure compressor 213 and a second air flow B which passes through the bypass duct 222 to provide propulsive thrust. The intermediate pressure compressor 213 compresses the air flow A directed into it before delivering that air to the high pressure compressor 214 where further compression takes place.

The compressed air exhausted from the high-pressure compressor 214 is directed into the combustion equipment 215 where it is mixed with fuel and the mixture combusted. The resultant hot combustion products then expand through, and thereby drive the high, intermediate and low-pressure turbines 216, 217, 218 before being exhausted through the nozzle 219 to provide additional propulsive thrust. The high, intermediate and low-pressure turbines respectively drive the high and intermediate pressure compressors 214, 213 and the fan 212 by suitable interconnecting shafts.

I claim:

1. A gas turbine engine comprising an upstream zone and a downstream zone, wherein:
   the downstream zone is a fire-critical zone that requires a predetermined flow rate of ventilation fluid during use;
   a convergent-divergent nozzle is provided between the upstream zone and the downstream zone, and is arranged to convey fluid from the upstream zone to the downstream zone via a throat aperture that converges adjacent the upstream zone and diverges adjacent the downstream zone; and
   the convergent-divergent nozzle includes an assembly movable to vary the size of the throat aperture of the convergent-divergent nozzle, thereby regulating the flow of ventilation fluid to the downstream zone.

2. The gas turbine engine according to claim 1, wherein the movable assembly includes at least one member formed of a shape memory alloy.

3. The gas turbine engine according to claim 2, wherein the movable assembly is movable between a first position in which the convergent-divergent nozzle presents a first throat aperture through which the fluid is able to flow, and a second position in which the convergent-divergent nozzle presents a second throat aperture through which the fluid is able to flow, the first and second throat apertures being of respectively different sizes.

4. The gas turbine engine according to claim 3, wherein the at least one member is configured such that heating the at least one member above a predetermined temperature causes the movable assembly to adopt the first position.

5. The gas turbine engine according to claim 4, wherein the at least one member is arranged to be heated by passing an electric current through the at least one member.

6. The gas turbine engine according to claim 4, wherein the at least one member is heatable by one or more heater elements controllable to heat the at least one member above the predetermined temperature.

7. The gas turbine engine according to claim 4, wherein the at least one member is configured such that cooling, or maintaining, the at least one member below the predetermined temperature causes the movable assembly to adopt the second position.

8. The gas turbine engine according to claim 3, wherein the movable assembly includes a spring member, arranged to urge the movable assembly to resile to the second position.

9. The gas turbine engine according to claim 8, wherein the spring member is provided in the form of a spring sheet.

10. The gas turbine engine according to claim 3, wherein the at least one member is provided in the form of a sheet member.

11. The gas turbine engine according to claim 10, wherein the spring member is provided in the form of a spring sheet, and the spring member and the sheet member are provided as a laminate sub-assembly.

12. The gas turbine engine according to claim 9, wherein the at least one member is provided in the form of a wire spanning a concave portion of the spring sheet to be capable of causing the movable assembly to adopt the first position in response to being heated above the predetermined temperature.

13. The gas turbine engine according to claim 3, wherein in the first position the convergent-divergent nozzle presents a first throat aperture size through which the fluid is able to flow, in the second position the convergent-divergent nozzle presents a second throat aperture size through which the fluid is able to flow, and the first throat aperture size is smaller than the second throat aperture size.

14. The gas turbine engine according to claim 3, wherein in the first position the convergent-divergent nozzle presents a first throat aperture size through which the fluid is able to flow, in the second position the convergent-divergent nozzle presents a second throat aperture size through which the fluid is able to flow, and the first throat aperture size is larger than the second throat aperture size.

* * * * *